United States Patent
Flesch et al.

(10) Patent No.: US 9,616,458 B2
(45) Date of Patent: Apr. 11, 2017

(54) SINTERING AND LASER FUSION DEVICE, COMPRISING A MEANS FOR HEATING POWDER BY INDUCTION

(75) Inventors: Thierry Flesch, Pringy (FR); Jean-Baptiste Mottin, Poitiers (FR)

(73) Assignee: SNECMA, Paris (FR)

( * ) Notice: Subject to any disclaimer, the term of this patent is extended or adjusted under 35 U.S.C. 154(b) by 546 days.

(21) Appl. No.: 13/982,106

(22) PCT Filed: Jan. 30, 2012

(86) PCT No.: PCT/FR2012/050196
§ 371 (c)(1),
(2), (4) Date: Jul. 26, 2013

(87) PCT Pub. No.: WO2012/104536
PCT Pub. Date: Aug. 9, 2012

(65) Prior Publication Data
US 2013/0309420 A1    Nov. 21, 2013

(30) Foreign Application Priority Data

Feb. 1, 2011 (FR) .................................. 11 50795

(51) Int. Cl.
*B05D 1/38* (2006.01)
*B22F 3/105* (2006.01)
*B05C 9/14* (2006.01)

(52) U.S. Cl.
CPC ................. *B05D 1/38* (2013.01); *B05C 9/14* (2013.01); *B22F 3/1055* (2013.01); *B22F 2003/1056* (2013.01); *B22F 2999/00* (2013.01); *Y02P 10/295* (2015.11)

(58) Field of Classification Search
None
See application file for complete search history.

(56) References Cited

U.S. PATENT DOCUMENTS

| | | | |
|---|---|---|---|
| 5,197,081 A * | 3/1993 | Fishman | H05B 6/22 219/647 |
| 5,554,837 A | 9/1996 | Goodwater et al. | |
| 2003/0222066 A1* | 12/2003 | Low | B22F 3/1055 219/121.83 |
| 2004/0056022 A1 | 3/2004 | Meiners et al. | |

FOREIGN PATENT DOCUMENTS

| | | |
|---|---|---|
| CN | 101070595 | 11/2007 |
| CN | 201168782 | 12/2008 |
| CN | 100503130 | 6/2009 |
| RU | 2 021 881 C1 | 10/1994 |
| WO | 95 06540 | 3/1995 |

OTHER PUBLICATIONS

International Search Report Issued Aug. 6, 2012 in PCT/FR12/50196 Filed Jan. 30, 2012.

* cited by examiner

*Primary Examiner* — Joel Horning
(74) *Attorney, Agent, or Firm* — Oblon, McClelland, Maier & Neustadt, L.L.P.

(57) ABSTRACT

A device for producing or building up a metal part by sintering and laser fusion, the device including a laser beam generator, a mechanism for deflecting the beam to scan a surface of the part to be produced, a sintering pan including a metal powder used to cover the surface of the part and to be melted by the laser beam to thicken the part, and at least one mechanism for heating powder contained in an area of the sintering pan by induction.

8 Claims, 2 Drawing Sheets

SINTERING AND LASER FUSION DEVICE, COMPRISING A MEANS FOR HEATING POWDER BY INDUCTION

The field of the present invention is that of the manufacture of metal parts and more particularly that in which a laser is used to manufacture these parts by selectively melting a powder bed. It also covers the case of the repair or reconstruction of parts by building up material.

A manufacturing technique in which parts are manufactured by sintering and then melting with a laser or electron beam is already known and widely used to produce rapid prototypes, i.e. to produce a small number of parts having complex shapes in a small amount of time. Sintering is a process that allows mechanical parts or other objects to be produced from relatively fine powders. In a first step, these powders are agglomerated by various processes in order to produce a preform, which is then heated in order to give it a certain cohesion. One heating technique that is commonly used to produce metal parts by sintering is what is called the laser melting technique. In this process, material in powder form is melted under the action of a high-power laser (powers from 200 W to a few kW). Repeatedly supplying powder and melting the latter with the laser allows the thickness of the part to be gradually increased, and choosing an appropriate laser scanning pattern allows the desired shapes to be obtained.

When this method is used to manufacture parts made of titanium, nickel or cobalt base alloys, as is the case for aerospace parts, high residual stresses are generated, which stresses are due to the thermal gradients generated by the melting of the layers in succession. The geometry, thickness and changes in the cross section of the parts to be produced are factors that may increase these gradients. Depending on the material, the residual stresses resulting from these gradients may lead to deformation of the part during construction and cracking during use.

It is therefore important for the temperature to be controlled during the melting process and for a uniform temperature to be maintained in the powder, in order to minimize the residual stresses generated during solidification.

There are various ways of controlling these thermal gradients, such as using hot plates, heating the powders by convection, or even preheating the powder using a high-energy beam. However, these methods have a number of drawbacks. The heating provided by a hot plate is characterized by the fact that it is localized in only the plate that holds the powder, the preheating temperature is limited and the heating is nonuniform through the build tray thickness; heating of powders by convection is for its part localized in the top face of the build tray and is non-uniform through the thickness of the powder; lastly, beam preheating is also localized in the top face of the build tray and is also non-uniform through the thickness of the build tray.

Overall, these methods enable only very localized temperature control and do not guarantee a uniform temperature in the part during its construction.

The aim of the present invention is to remedy these drawbacks by providing a device and a process allowing the above drawbacks to be mitigated and therefore parts to be produced or built-up by laser melting of a powder bed, the resulting parts, after solidification, containing residual stresses that are as small as possible.

For this purpose, one subject of the invention is a device for producing or building up a metal part by laser sintering and melting, comprising a generator for generating a laser beam, a means for deviating said beam in order to sweep it over the surface of the part to be produced, and a sintering tray containing a metal powder intended to cover the surface of the part and to be melted by the laser beam in order to increase the thickness of said part, characterized in that it furthermore comprises at least one inductive heating means for heating the powder contained in a zone of said sintering tray.

The inductive heating allows the temperature of the part and that of the surrounding powder to be controlled and therefore temperature gradients within the part to be controlled.

Advantageously, the sintering tray has a cylindrical shape the sidewalls of which (i.e. the walls formed by the generatrices of the cylinder) hold a number of inductive heating means, said walls being made of a material that is not susceptible to inductive heating.

Even more advantageously, the cylinder-shaped sintering tray comprises a vertically movable base (the base being defined as a surface cutting all of the generatrices of the cylinder), the sidewalls being encircled by a number of layers of heating means, said layers being tiered over the entire length of travel of the movable base, each layer consisting of a number of inductive heating means positioned at the same distance from said movable base.

These multiple heating means make it possible to regulate the temperature to the desired value in each zone of the powder bed contained in the sintering tray.

Preferably, the sintering tray comprises a base intended to receive the part to be produced, said base being equipped with a heating means and a means for regulating its temperature. Thus possible thermal pumping effects in the vicinity of the base are prevented.

In a particular embodiment the device furthermore comprises at least one means for measuring the temperature of the powder at a point located within the sintering tray.

Preferably, the sintering tray holds a measuring rod equipped with at least one thermocouple, said rod extending in order to pass at least partway through the powder bed contained in said tray.

Advantageously, the device furthermore comprises a means of regulating the temperature of at least one point in the powder bed by way of at least one heating means, said heating means being controlled depending on the value delivered by said means for measuring the temperature of the powder.

Another subject of the invention is a process for producing or building up a metal part by laser sintering and melting, said part being placed in a sintering tray containing a metal powder intended to be melted by a laser beam in order to increase the thickness of said part, the process comprising a step of covering that surface of the part the thickness of which is to be increased with a thickness of powder, a step of melting the powder by sweeping said laser beam over it, and a step in which the molten material is solidified by cooling, characterized in that it furthermore comprises a step of inductive heating of the powder contained in said sintering tray.

In one particular embodiment, the inductive heating is carried out before the laser melting.

In another particular embodiment, the inductive heating is carried out after the laser melting in order to regulate the temperature of the powder contained in the sintering tray during the phase in which the liquid portion of the part solidifies.

The invention will be better understood and other aims, details, features and advantages thereof will become more clearly apparent from the following detailed explanatory description of an embodiment of the invention, given by way of purely illustrative and nonlimiting example, and with reference to the appended schematic drawings.

In these figures:

FIG. 1 shows a machine for producing a metal part by laser sintering and melting.

Figure 1:
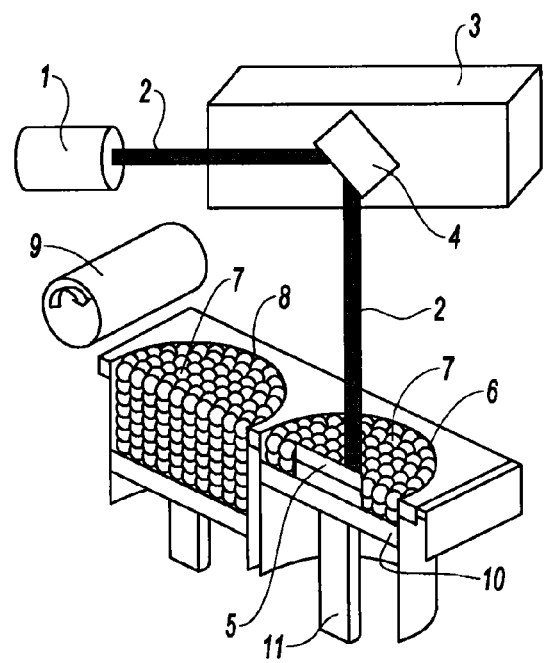
FIG. 1 is a schematic view of a laser sintering/melting machine.

A laser-beam generator 1 emits a laser beam 2 that is directed toward a set of reflective mirrors 3, the last mirror 4 of which can pivot in order to allow the beam to be swept over the surface of the part 5 to be produced. It will be noted that the laser beam is not necessarily routed by mirrors; an optical fiber could be used, depending on the wavelength of the laser employed, and the laser beam could be swept over the surface using other means, such as F-theta lenses.

The part 5 is placed on a build plate 10 located facing the laser beam 2; it is moreover submerged in a tray 6 so that it can be regularly covered with a layer of metal powder 7 suitable for sintering. A second tray for supplying powder is positioned beside the sintering tray 6 and is filled with the sintering powder 7. A piston-type device 9 allows an amount of powder 7 to be moved from the supply tray 8 to the sintering tray 6 in order to cover the part 5 with a powder layer of given thickness. The thickness of this layer corresponds to that by which the thickness of the part will be increased during one melting sweep of the laser beam 2, after allowing for compaction and solidification shrinkage. Devices for lowering the sintering tray 6 and raising the supply tray 8 allow, on the one hand, the part 5 to be sintered to be kept flush with the walls of the tray 6, and on the other hand, a layer of metal powder 7 of the correct thickness to be spread by the piston 9 from the supply tray 8.

Sintering of the part 5 and melting of the powder by the laser is achieved by successive elementary operations that are carried out in the following way: the part 5 is positioned flush with the top of the walls of the sintering tray 6, the piston 9 is moved in the direction of this tray 6 so that it deposits the desired thickness of powder 7 on the part 5, it then returning to its standby position at the end of the supply tray 8. The laser beam 2 is swept over the surface of the part 5 using the oscillating mirror 4, thereby causing the layer of metal powder to melt and aggregate on the part 5, therefore causing the thickness of the latter to increase. The part 5 is then drawn downward in order to compensate for the increase in its thickness and so that its surface once more lies flush with the sintering tray 6, whereas the supply tray 8 is raised in order to again place a suitable amount of metal powder 7 facing the piston 9. This process is repeated the number of times required to obtain the desired geometry and dimensions of the part 5.

Figure 2:
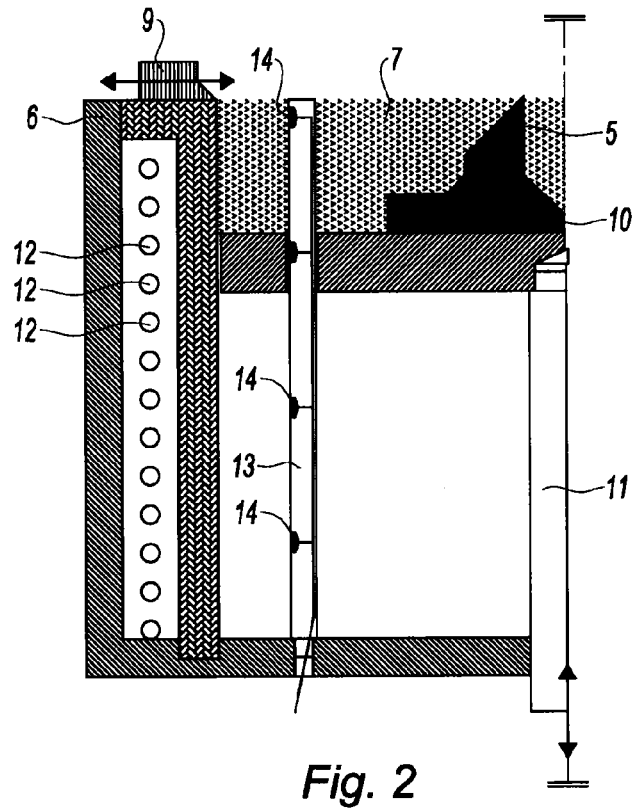
FIG. 2 is a schematic vertical cross-sectional view of a laser sintering/melting machine according to one embodiment of the invention.
Figure 3:
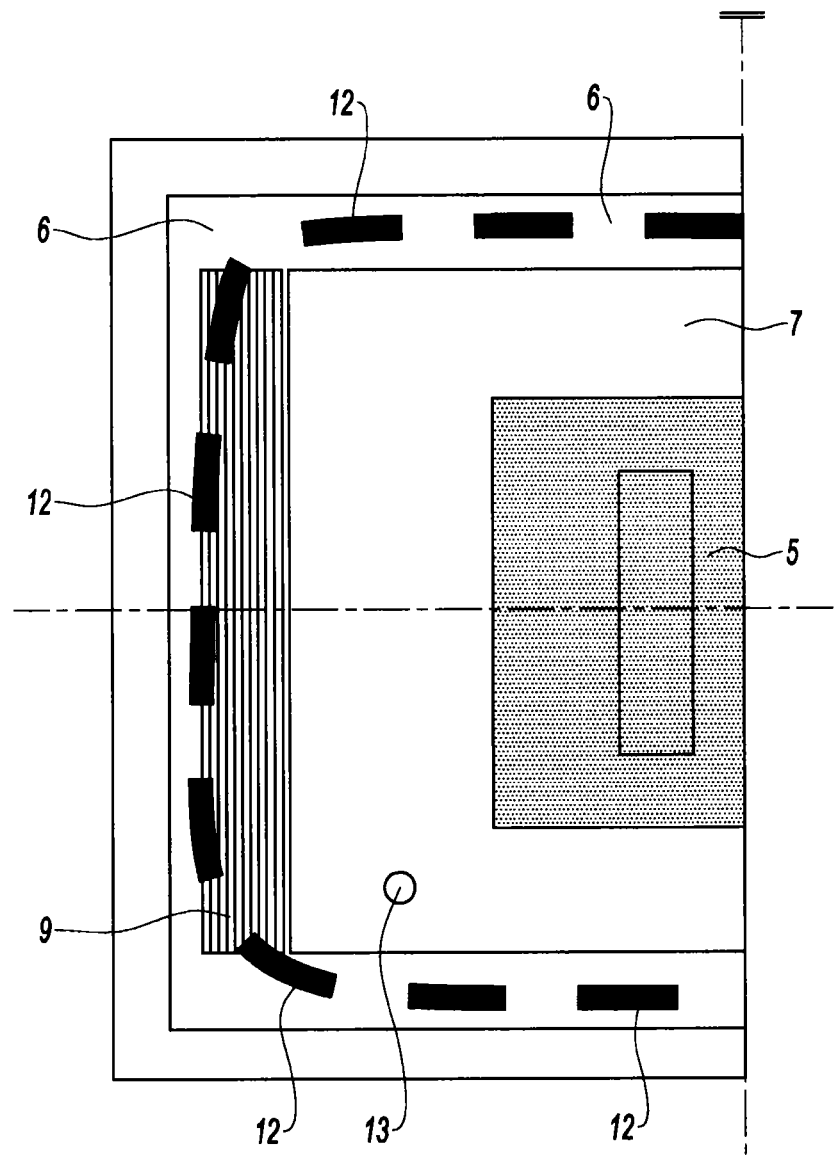
FIG. 3 is a top view of the machine in FIG. 2.

A device allowing parts to be produced by laser sintering and melting will now be described with reference to FIGS. 2 and 3.

The part 5 to be produced is placed on the build plate 10, which is able to move vertically under the action of a lowering piston 11, and covered with a sintering powder 7 spread by a supply piston 9 from a supply tray (not shown). The sintering tray 6 shown here is cube-shaped, although this is not necessarily the case. A series of inductors 12 are embedded inside the walls of this sintering tray; these inductors, which are connected to a power supply (not shown), are intended to give the powder bed the desired temperature. Horizontally, these inductors are regularly spaced around the periphery of the sintering tray 6 in order to make the powder bed temperature as uniform as possible; vertically, a number of series of inductors are stacked one above the other so as to allow the powder to be heated whatever the size obtained by the part 5, i.e. whatever the position occupied by the build plate 10 in the vertical plane. The series of inductors thus extends as far as the bottom portion of the vertical walls of the sintering tray 6.

A control rod 13 is located in the middle of the sintering tray, at a distance away from the walls of the sintering tray and from the part to be manufactured that is compatible with the operations to be carried out, said control rod 13 passing through the build plate 10 and extending vertically across the entire height of the sintering tray. The build plate 10 is thus drilled with a hole that allows it to move vertically as the thickness of the part 5 increases without interfering with the control rod 13. This rod holds a number of means for measuring the temperature of the powder, such as thermocouples for example, which are regularly spaced over its height. They are used to measure the temperature of the powder 7 when the position of the plate 10 is such that these thermocouples 14 lie above said plate and thus make contact with the powder 7.

How the device according to the invention produces a part by laser sintering and melting will now be described. A part is repaired by material deposition in an analogous way.

The part is produced in substantially the same way as in a conventional device, i.e. powder, taken from the supply tray 8, is spread by the supply piston 9 over the part 5 the thickness of which it is desired to increase. A laser beam 2 is swept over this powder with a scanning pattern that describes the area to be thickened and that locally melts the powder, so as to agglomerate it with the existing part.

However, the invention differs therefrom in that the device also comprises a series of inductors 12 the function of which is to regulate the temperature of the powder 7 during the phase in which the molten metal solidifies and agglomerates with the existing part.

These inductors, which are fitted around the perimeter of the build plate and envelop the article during manufacture, form a system for heating the powder because of the metallic nature of the latter. They are separated from the powder 7 by the walls of the sintering tray 6, which walls are made of a material allowing the powder to be heated by induction but that themselves undergo almost no heating under the effect of induced currents.

This heating system is controlled by a system for regulating the temperature of the powder in its various zones based on temperature information measured by the control rod 13 and its thermocouples 14. These temperature measurements allow the heating provided by the inductors 12 to be controlled in order to regulate the temperature of the part 5 in construction and the surrounding powder 7. On account of the many inductors present around the sintering tray 6, the temperature of the powder may be regulated on a zone-by-zone basis, thereby providing better control of the cooling and solidification by allowing certain particular parameters to be taken into account, such as the thickness of the previously agglomerated material at each point of the part and therefore its local properties in terms of conduction and convection.

A program for controlling the inductive heating, that it is within the abilities of a person skilled in the art to develop, defines the electrical current that must pass through each inductor in order to obtain the desired temperature at each point in the tray of powder. If required, one phase of the development of this program may involve carrying out a calibration, using a reference part, of each of the types of alloy from which it is envisioned to produce a part.

Thus, the invention allows, because measurements are carried out at various heights using the thermocouples 14 of the rod 13, the correct powder temperature to be obtained at every point in the build tray, and therefore correct cooling of the part 5 during its production to be guaranteed.

In addition, the device may also comprise, to improve the regulation provided by the system, a system for heating the plate, preventing thermal pumping effects that could otherwise appear due to the presence of a cold build plate at the base of the tray 6. This plate may be heated by any conventional means, such as for example a set of heating rods that pass through its thickness.

In a particular embodiment, the position of the control rod 13 might not be fixed but might instead be tailored to the part to be produced and the shape of the latter. For this purpose, several alternative locations are provided for the orifice in the build plate 10 through which the rod 13 passes. It is thus possible to refine the temperature measurements and optimize the heating at each point of the powder 7.

The invention claimed is:

1. A device for producing or building up a metal part by laser sintering and melting, comprising:
    a generator for generating a laser beam;
    a means for deviating the beam to sweep the laser beam over a surface of the part to be produced;
    a sintering tray including a metal powder bed that can cover the surface of the part and that can be melted by the laser beam to increase a thickness of the part; and
    inductive heating means for heating the metal powder via induction, wherein the metal powder heated via induction is contained in a heating zone of the sintering tray,
    wherein said means for deviating the beam is configured to deviate the beam so as to melt said metal powder in said heating zone, and
    wherein said inductive heating means comprises inductors arranged around different heating zones of said powder bed contained in the sintering tray and vertically in a direction of the sintering tray.

2. The device as claimed in claim 1, wherein the sintering tray has a cylindrical shape with sidewalls that hold the inductors, the walls being made of a material that is not susceptible to inductive heating.

3. The device as claimed in claim 2, wherein the cylinder-shaped sintering tray comprises a vertically movable base, the sidewalls being encircled by a number of layers of inductors, the layers being tiered over an entire length of travel of the movable base, each layer including a number of inductors positioned at a same distance from the movable base.

4. The device as claimed in claim 3, wherein the sintering tray comprises a base configured to receive the part to be produced, the base including a heating means and a means for regulating its temperature.

5. The device as claimed in claim 2, wherein inductors are provided in a bottom portion of the sidewalls of the sintering tray.

6. The device as claimed in claim 1, further comprising at least one means for measuring temperature of the powder at a point located within the sintering tray.

7. The device as claimed in claim 6, wherein the sintering tray holds a measuring rod including at least one thermocouple, the rod extending to pass at least partway through the powder bed contained in the tray.

8. The device as claimed in claim 6, further comprising a means of regulating temperature of at least one point in the powder bed by at least one heating means, the heating means being controlled depending on a value delivered by the means for measuring the temperature of the powder.

* * * * *